United States Patent [19]
Berkey et al.

[11] Patent Number: 5,916,706
[45] Date of Patent: Jun. 29, 1999

[54] HONEYCOMB BATTERY STRUCTURE

[75] Inventors: George E. Berkey, Pine City; John L. Stempin, Beaver Dams; Ronald L. Stewart, Big Flats; Dale R. Wexell, Corning, all of N.Y.

[73] Assignee: Corning Incorporated, Corning, N.Y.

[21] Appl. No.: 08/723,492

[22] Filed: Sep. 30, 1996

Related U.S. Application Data

[60] Provisional application No. 60/005,207, Oct. 11, 1995.

[51] Int. Cl.⁶ .................................................. H01M 2/18
[52] U.S. Cl. .......................... 429/131; 429/135; 429/140; 429/152
[58] Field of Search .................................. 429/131, 135, 429/140, 152

[56] References Cited

U.S. PATENT DOCUMENTS

| | | |
|---|---|---|
| Re. 15,067 | 3/1921 | Baird et al. . |
| 3,379,570 | 4/1968 | Berger et al. . |
| 3,446,668 | 5/1969 | Arrance et al. . |
| 3,446,669 | 5/1969 | Arrance et al. . |
| 3,489,610 | 1/1970 | Berger et al. . |
| 3,607,403 | 9/1971 | Arrance ........................................ 136/6 |
| 3,625,765 | 12/1971 | Arrance ...................................... 136/20 |
| 3,661,644 | 5/1972 | Arrance ........................................ 136/6 |
| 3,885,977 | 5/1975 | Lachman et al. . |
| 3,905,743 | 9/1975 | Bagley . |
| 3,944,432 | 3/1976 | Brinkmann et al. ..................... 429/136 |
| 4,160,068 | 7/1979 | Kummer ..................................... 429/82 |
| 4,455,180 | 6/1984 | Hillman et al. ........................... 156/89 |
| 5,208,121 | 5/1993 | Yahnke et al. . |
| 5,342,709 | 8/1994 | Yahnke et al. . |

FOREIGN PATENT DOCUMENTS 042155  6/1968  Japan .

*Primary Examiner*—Stephen Kalafut
*Assistant Examiner*—Carol Chaney
*Attorney, Agent, or Firm*—Milton M. Peterson

[57] ABSTRACT

A battery construction and a method of producing the construction. The construction comprises a ceramic separator having a honeycomb structure in which cells run lengthwise of the honeycomb and are separated by porous walls, and internal positive and negative electrodes positioned in part at least within the honeycomb structure.

12 Claims, 4 Drawing Sheets

HONEYCOMB BATTERY STRUCTURE

This application claims the benefit of U.S. Provisional application Ser. No. 60/005,207, filed Oct. 11, 1995, entitled HONEYCOMB BATTERY STRUCTURE, by George E. Berkey, John L. Stempin, Ronald L. Stewart and Dale R. Wexell.

RELATED APPLICATIONS

Applications entitled BATTERY SEPARATOR and HONEYCOMB BATTERY SEPARATOR, filed Jun. 19, 1995 and Jul. 26, 1995 under Ser. No. 08/491,766 and Ser. No. 08/506,713, respectively now U.S. Pat. Nos. 5,514,494 and 5,554,464. The first application is directed to a rigid, porous, ceramic battery separator having a porosity of 40–90%, a pore size of 0.1–25 microns, a thickness of 1–12 mm and resistance to acid attack. The second application is directed to an elongated, rigid, porous, ceramic separator for a battery, the separator having a honeycomb structure in which open cells are separated from adjacent cells by thin, porous, ceramic walls, the cell walls being porous and the open cells and wall pores being adapted to be filled with an electrolyte.

1. Field of the Invention

Separators of honeycomb structure for a metal-electrolyte-metal battery.

2. Background of the Invention

The oldest and best known type of rechargeable battery is the lead-acid battery. While the present invention is not so limited, it has been developed as an improved lead-acid type battery. Accordingly, the description is primarily in terms of such a battery.

A typical lead-acid battery comprises a positive electrode, a negative electrode, one or more separators, and an electrolyte. The electrodes function both as electrical contacts and as mechanical load-bearing elements. Each electrode is formed by coating a lead or lead alloy grid with an active paste material. The paste dries to form a porous layer of the active material as part of each electrode.

A separator may be any porous, perforated, or fibrous material that sufficiently isolates the electrodes to prevent short circuiting. However, the separator must also be sufficiently open to permit ion transfer through the electrolyte contained in the separator. Perforated plastic, or glass fiber, sheets are commonly used as separators. A compressed mat of glass fibers is currently used in many commercial storage batteries.

Porous earthenware and sintered silicate sheets have also been proposed. However, they have not been adopted commercially to any significant extent. One problem has been lack of sufficient porosity to permit proper operation of a battery.

The electrolyte may be any ionic medium that can provide ion transfer between the electrodes. In a lead-acid battery, sulfuric acid is the electrolyte employed.

A battery may be packaged in a plastic case for insulating purposes. However, the electrodes constitute the primary mechanical support and load-bearing means in current storage battery construction.

The glass fiber mat, now in use as a separator, has certain desirable features. It readily takes up and holds electrolyte, a property commonly referred to as wettability or wickability. It is also resistant to attack by the electrolyte, and provides acceptable electrical properties.

The fiber mat separator is, however, flexible and lacking in mechanical strength. This means that the electrodes, the casing, or other support members must be the primary source of structural integrity in a battery.

Batteries are commonly classified as either a flooded type or a starved, or sealed, type. In both types, the electrodes are in contact with the separator and held in that assembly. The porous, active material coating on the metal grids, as well as the separator, become saturated with electrolyte. In the flooded type, the electrode and separator assembly is immersed in excess electrolyte so that the open space around the assembly is filled with electrolyte, e.g. sulfuric acid. In the starved, or sealed, type, the electrolyte is completely contained within the pores of the separator and electrode paste. In this construction, it is important that the electrolyte be retained in the pores to avoid leakage of the corrosive acid electrolyte.

U.S. Pat. No. 5,554,464 describes a rechargeable battery assembly comprising an elongated, rigid, porous, ceramic separator. The separator has a honeycomb structure in which open cells are separated from adjacent cells by thin, porous, ceramic walls, the open cells and separating walls running lengthwise of the honeycomb separator. The cell walls are porous, and the open cells and wall pores are available to be filled with an electrolyte to permit ion flow between electrodes in a battery. In this assembly, electrodes are applied externally, that is, to the side walls of the separator.

The present invention is also based on a battery assembly employing a porous, ceramic, honeycomb body as a separator. In the present battery, however, electrodes are assembled internally, that is, within the cells of the honeycomb body.

SUMMARY OF THE INVENTION

The invention resides in part in a battery construction comprising a ceramic separator having a honeycomb structure in which cells run lengthwise of the honeycomb and are separated by porous walls, and internal positive and negative electrodes positioned in part at least within the honeycomb structure.

It further resides in a method of producing the battery construction which comprises forming an extrudable mixture of ceramic material precursors, extruding the mixture through a die designed to produce an elongated body having open cells running lengthwise of the body with thin walls defining and separating the cells, cutting the separator from the extruded, elongated body, introducing active material into selected cells and positioning an electrode wire in each cell.

PRIOR ART

Prior art known to Applicants and deemed relevant is supplied separately.

BRIEF DESCRIPTION OF THE DRAWINGS

In the accompanying drawings.

DESCRIPTION OF THE INVENTION

The present invention, like that of our second related patent, adopts prior honeycomb production technology. In particular, it adopts honeycomb structures and production features from the art of ceramic substrates designed for catalytic converters used in treating exhaust gases.

The term "honeycomb" has come to mean cellular, extruded, porous bodies regardless of cell shape. Thus, the cells are not restricted to the conventional hexagonal shape, but may have any desired cross-sectional geometry such as oval, round, rectangular, square, and triangular.

Honeycomb substrates for catalytic converters are extruded in continuous, elongated bodies sometimes referred to as logs. These bodies may also be extruded in any desired cross-sectional geometry, such as, oval, round, rectangular, square and triangular.

The extruded bodies are customarily composed of open cells running the length of the log. The cells are separated and defined by thin, porous walls. Cell sizes may vary from 2 to 2300 cells/6.25 sq. cm. (sq.") of open face. For present purposes, no more than about 100 cells/6.25 sq. cm. are practical to permit introduction of wires and active material as described subsequently. The cells are usually of uniform size, but may be of variable size and/or shape depending on the extrusion die pattern.

The invention is based on two functional concepts for using an extruded honeycomb substrate as a battery separator. The first concept involves employing the separator as the essential supporting structure for a battery cell. The second concept involves assembling wires internally in honeycomb cells to function as electrodes. These concepts may be embodied in a number of different assemblies. Some typical examples are illustrated in the accompanying drawings as described hereafter.

Figure 1:
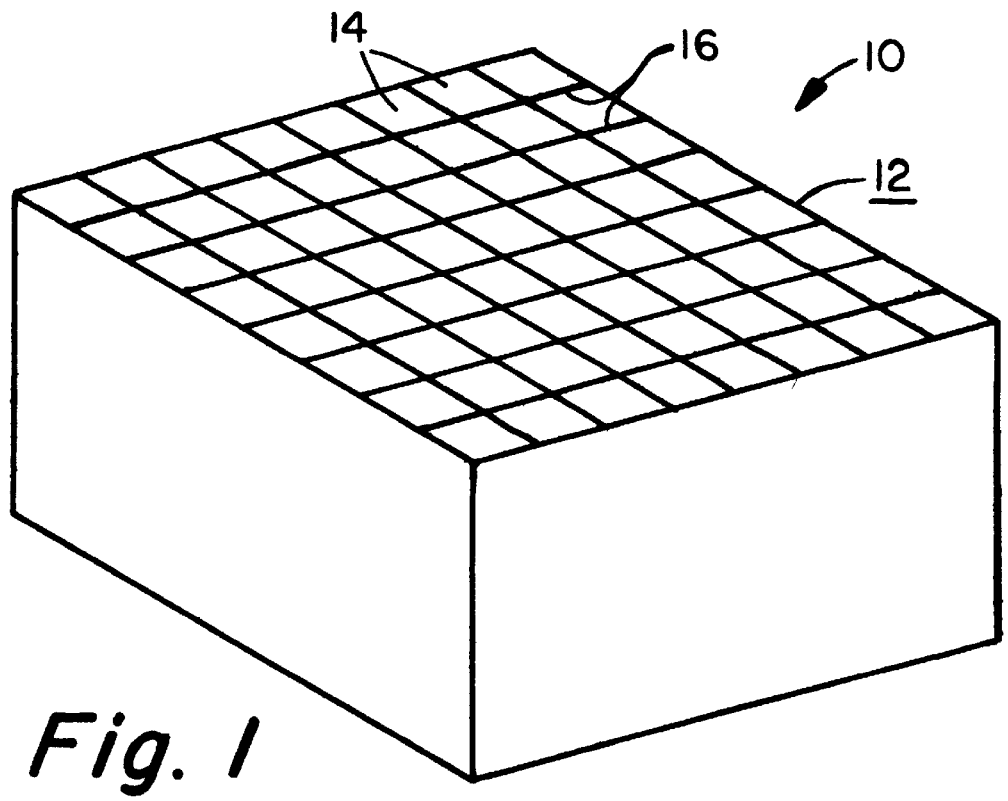
FIG. 1 is a perspective view of a square, ceramic, honeycomb body.

FIG. 1 is a perspective view of a square, ceramic, honeycomb body 10 having 64 open cells as extruded. Body 10 is produced in conventional manner by extruding a batch of suitable composition through a square die such as disclosed in U.S. Pat. No. 3,905,743 (Bagley). It will be appreciated that extrusion dies can be constructed to produce almost limitless different cross-sectional shapes. Cylindrical or oval bodies are commonly extruded for catalytic converter use. For present purposes, we have used square or rectangular bodies for larger size batteries, and round bodies for small assemblies such as C batteries.

Figure 2:
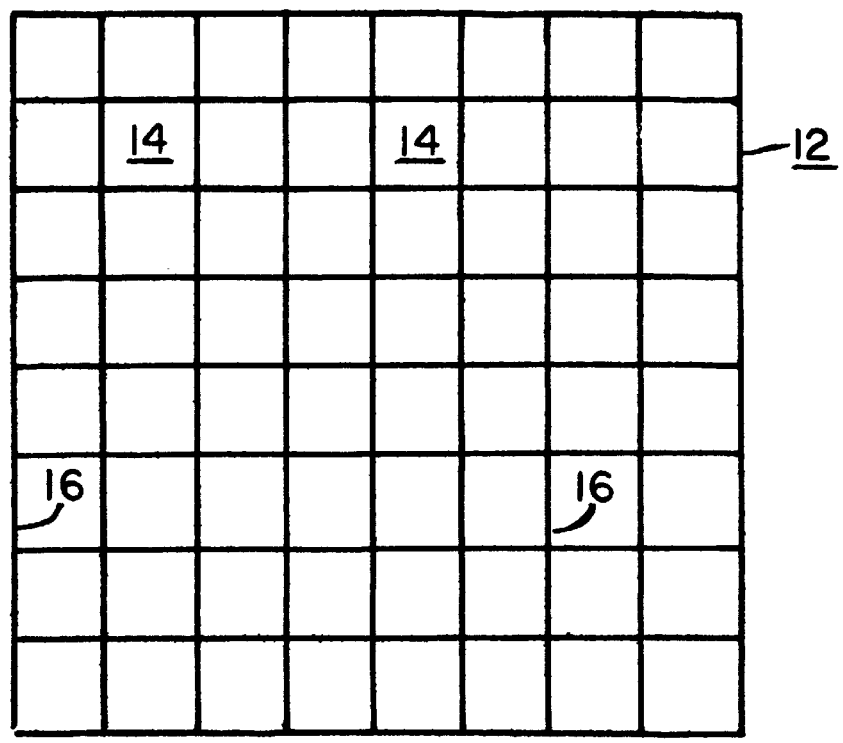
FIG. 2 is a top plan view of the body of FIG. 1.

FIG. 2 is a top plan view of body 10 showing the upper face 12 thereof. Face 12 has a preferred arrangement of equal size cells with walls of uniform thickness. If necessary, dies can be produced to provide bodies having non-uniform cell and/or wall dimensions.

Body 10 contains open channels, or cells, 14 that run the length of body 10. Cells 14 are of uniform size throughout their length. For present purposes, cells 14 have a common size, that is, provide areal openings of equal size. The size is generally defined in terms of cells per unit area, and is dependent on the requirements of the battery application involved.

Cells 14 are defined by thin walls 16 which surround each cell and separate it from adjacent cells in the honeycomb. The thickness of wall 16 may be varied depending on the extrusion die employed, the nature of the batch extruded, and the rate of extrusion.

In general, wall thickness decreases as the numbers of cells per unit area increase. A major factor to consider is structural integrity, that is, the fragility of the structure. As a general rule, cell size and wall thickness are relatively uniform throughout a body. This provides improved battery performance as well as convenience in production. Wall thickness may vary from about 1.5 mm. (1/16"), in the case of a few cells per unit area, down to about 0.12–0.25 mm. (5–10 mils), in the case of a honeycomb with a hundred cells per unit area.

Batteries with electrodes mounted internally in a honeycomb separator may be assembled in a variety of ways. A primary consideration is that any electrical leakage between the positive and negative electrodes, including the active coatings associated therewith, must be avoided. Another major consideration is that the porosity in the separator be sufficient to contain the electrolyte and permit ionic flow between the electrodes.

Figure 3:
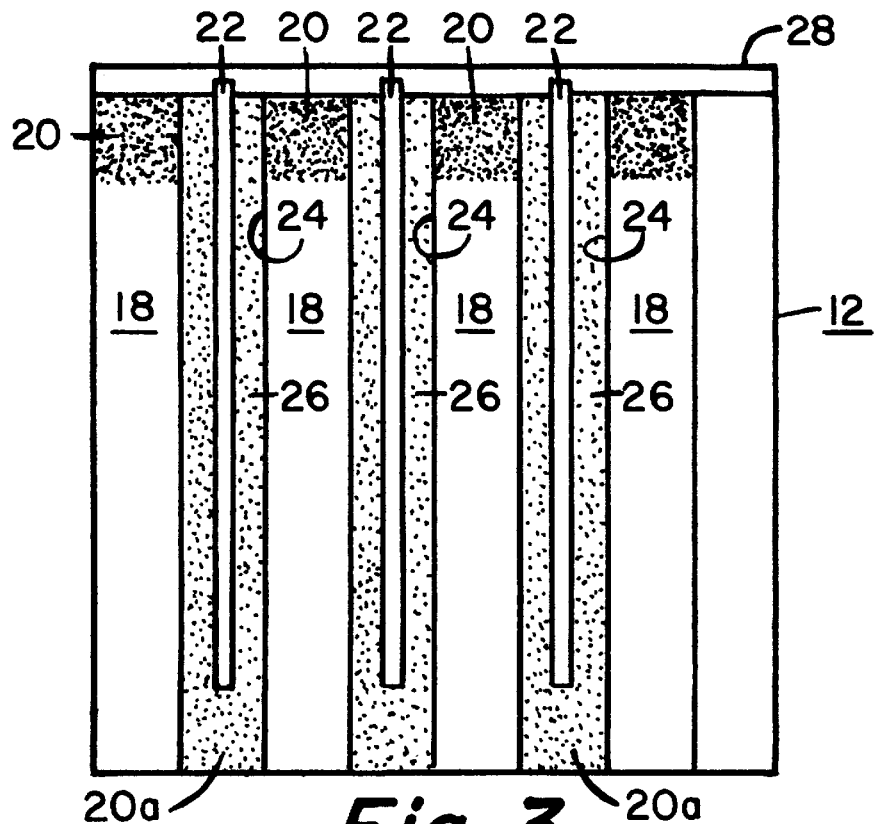
FIG. 3 is a cross-sectional view taken vertically downward from one face of the body of FIG. 1.
Figure 4:
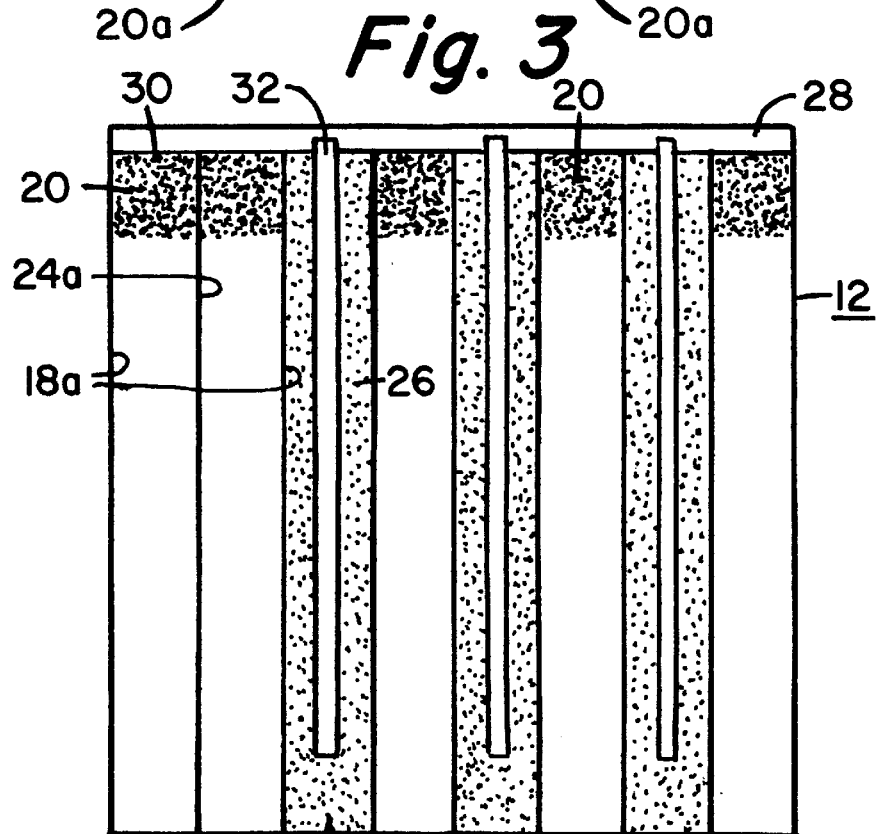
FIG. 4 is a view similar to FIG. 3 but taken vertically up from the opposite face of the body of FIG. 1.

FIGS. 3 and 4 illustrate one manner of assembly. FIG. 3 is a cross-sectional view taken vertically down from face 12 through body 10. It shows the body after initial processing to produce the battery anode. FIG. 4 is a similar view illustrating cathode production.

The first step in carrying out the assembly is to close off selected cells 18 on face 12 of body 10. One row of cells around the periphery of the body will be closed, as will alternate cells within the interior of this periphery row of cells. The sealing material 20 employed to seal off cells 18 extends inwardly in each sealed off cell a short distance from face 12. Its extent is shown by a dotted area in each cell in FIG. 3.

The next step is to insert wires 22 of appropriate size and composition into each of unfilled cells 24. Wires 22 may be lead-containing, conducting wires that extend the length of the cell. They also extend some distance out from face 12 to permit making electrical contact. Wires 22 collectively become the positive electrode of the battery.

A mixture of lead oxide and free lead powder 26 is now introduced into unfilled cells 24 around wires 22. Vibration can be used to assist introducing the powder into the cells. The cells will be only partially filled to allow for expansion when an electrolyte, such as sulfuric acid, is introduced. This forms a paste which functions as the active material for each wire electrode. A feature of the inventive construction is optimum utilization, and confinement during service, of active material.

The open cells 24 are now sealed off and the several wires 22 are integrated to form a terminal. One procedure is to cover face 12 with a layer of polymer that forms a rigid coating with wires 22 protruding. The wires may then be soldered together, or otherwise integrated, to form a single positive terminal.

Alternatively, wires 22 may be such as to protrude only a short distance above face 12. In that case, face 12 is dipped into molten lead, or otherwise provided with a lead coating. This simultaneously forms contact with each wire electrode 22 to form a unified anode terminal 28.

The procedure just described is now reversed to form a negative electrode for the battery assembly. This is described with reference to FIG. 4 which is substantially similar to FIG. 3. FIG. 4 shows the opposite face 30 of honeycomb body 10. Each cell 18, which remains unfilled on face 12, is now filled on face 30. This isolates wires 22 from possible contact with the cathode being formed on face 30.

Cells 18 that were closed off on face 22 are left open on face 30, except for the peripheral row of cells. Wires 32 are positioned in cells 18 in the same manner as wires 22 were positioned in cells 24. The powder mixture 26 containing lead, and an acid electrolyte, are introduced around each of wires 32 to form the negative active material. Again, wires 32 protrude sufficiently beyond face 30 to permit integrating into a terminal, in this case the negative terminal or cathode. Face 30 is then sealed off, and wires 32 are integrated, as before. This may be as described with reference to FIG. 3, that is, by a plastic coating plus soldering of the wires, or by applying a lead coating.

When faces 12 and 30 are sealed off, the outside of body 10 should be porous to prevent possible pressure buildup during battery operation. It will also be appreciated that the sealing off of cells 18 and 24 could more conveniently be carried out prior to introducing wires and powder at either face. Also, in the charging process, PbO is oxidized to $PbO_2$ at the cathode and reduced to Pb at the anode. Accordingly, the initial charging step might be eliminated, or at least shortened, by introducing $PbO_2$ powder around wires 22 and lead powder about wires 32.

The introduction of powdered material into the cells can be a very tedious operation, particularly where small cells are involved. Accordingly, an alternative method has been devised. In this alternative method, a closed end, tubular member of smaller OD than cell diameter is provided with a pattern of holes along its sides. An active material paste of suitable viscosity for application is prepared. The tubular member is filled with this paste. The tube is then inserted into a cell and air pressure applied to the open end of the tube. This extrudes paste into the cell, thereby coating the cell walls. Removal of the tube then leaves the walls coated with a layer of paste. This eliminates the problems with non-uniformity in filling with dry powder. It also aids in properly centering the electrode wires in the cells.

A lead/antimony alloy wire provides the necessary stiffness to permit ease of handling the wire. Wire size, cell size, and the resultant volume ratio of electrode wire to active material in a cell will vary depending on requirements of a particular application. Wire size should be large for a deep discharge battery, and fine for high power applications. With wires inserted in the coated cells, the honeycomb faces are then sealed off, as described above, by a plastic or lead coating.

The appropriate ratio of acid to electrode material is critical to proper operation of a lead-acid battery. Sufficient excess acid must be present to permit ready availability of hydrogen ions at the cathode. A ceramic honeycomb battery structure may be utilized to provide a reservoir of acid electrolyte. This reservoir supplies acid to the individual electrode cells as necessary through the porous walls. Some typical cell arrangements for this purpose are now described.

Figure 5:
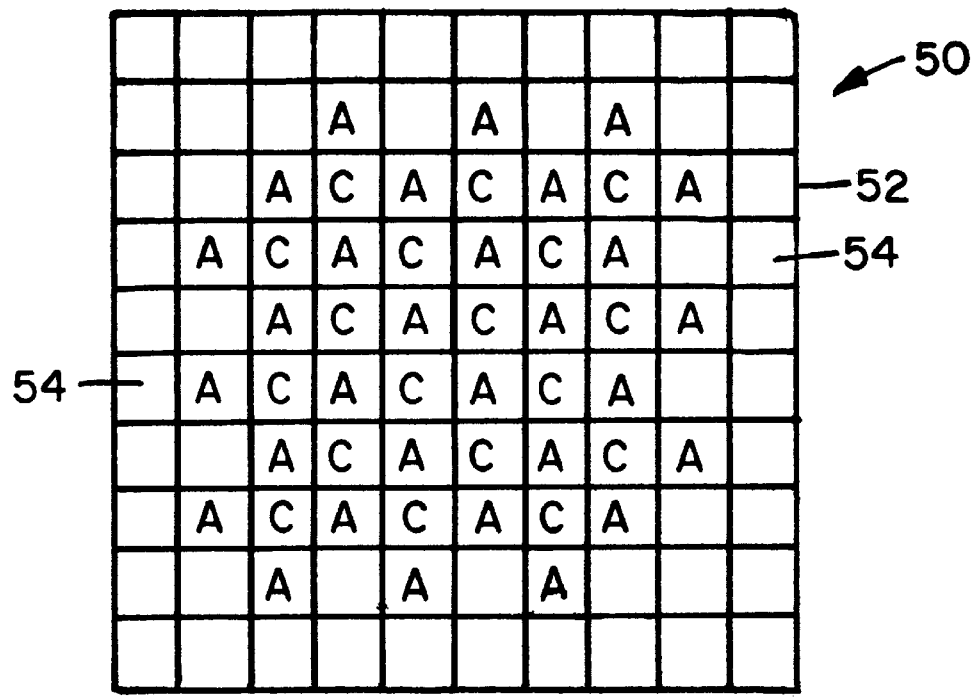
FIGS. 5, 6 and 7 are top plan views of honeycomb bodies illustrating different cell patterns in accordance with the invention.

FIG. 5 illustrates one of the numerous pattern variations that are possible in utilizing a honeycomb body in accordance with the present invention. FIG. 5 is a top plan view of one face of an assembly 50 such as described in FIGS. 3 and 4. Each square in face 52 of assembly 50 represents a cell 54 that runs lengthwise of the honeycomb body. The lines represent cell walls. A feature of this assembly is that the cells marked A represent electrolyte reservoirs. Thus, to the extent that electrolyte may be expended, an internal reservoir is provided. The cells marked C will have electrode assemblies produced therein.

Figure 6:
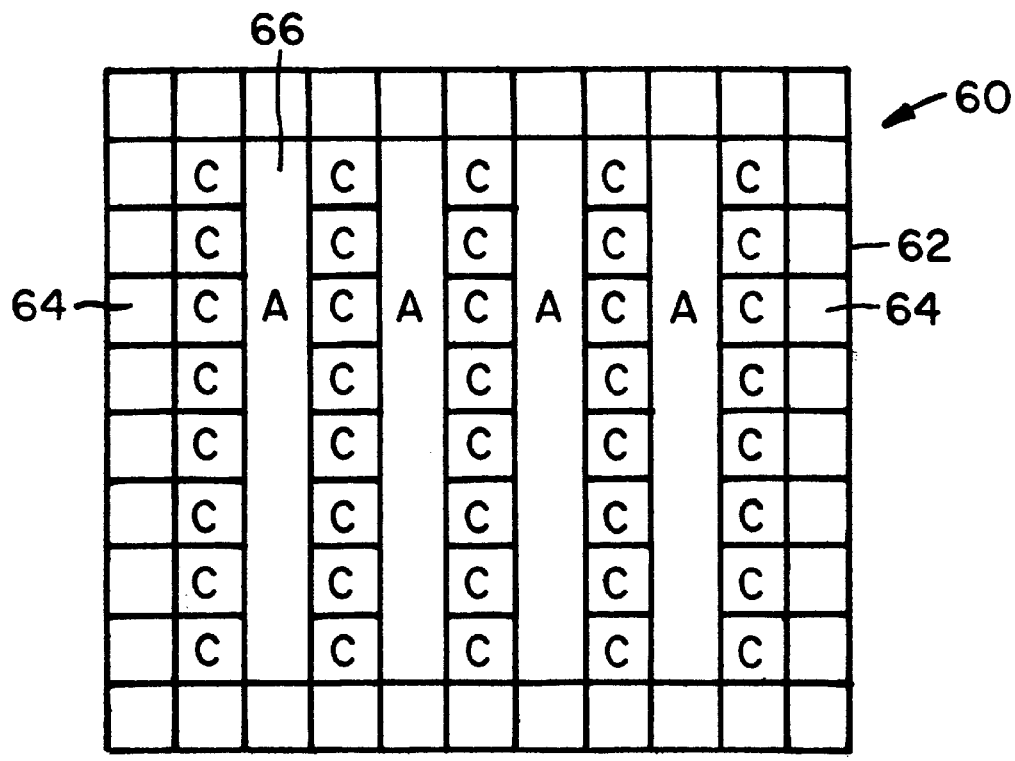

FIG. 6 is also a top plan view of face 62 of an assembly 60. It illustrates still another useful pattern of cells 64. This pattern is particularly useful where one face of the body is completely sealed off, and both the anode and cathode terminals are formed on the opposite face. In pattern 60, cells 64 having anode or cathode wires inserted are designated by C. Cells 64 are arranged in rows with the spaces 66 between any two rows functioning as reservoirs.

With the active cells arranged in rows, the production of anode and cathode terminals may be simplified. Thus, either an anode or cathode terminal may be formed by applying a conductive layer along a row of cells. For example, a conductive layer might be applied over each vertical row of active cells in the arrangement of FIG. 6. Necessarily, all of the cells in any row so bridged will have a common sign, that is, all positive or all negative electrodes.

The assemblies and cell arrangements shown above have utilized a square honeycomb configuration with square cells. However, it should be appreciated that other honeycomb configurations, such as round, oval, or triangular may be employed. These may have cells of square, or other geometric, design depending on the die employed to extrude the honeycomb.

Figure 7:
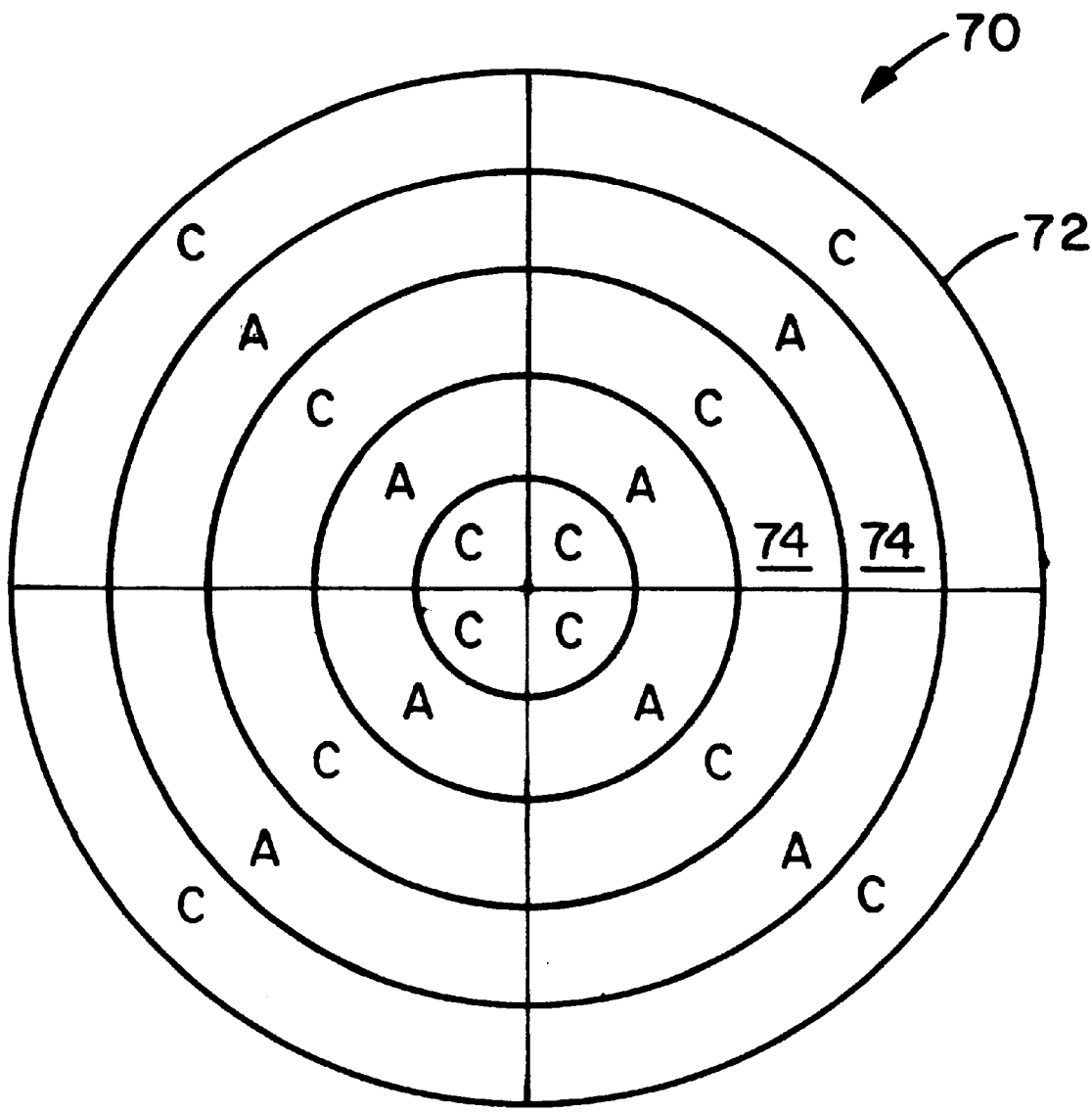

For example, a cylindrical honeycomb body may have annular cells subdivided as desired. FIG. 7 is a top plan view of face 72 of an assembly 70. It shows such a pattern wherein the annular cells 74 are subdivided into quarters. As in FIGS. 5 and 6, acid reservoirs, that is open cells, are shown as A and electrode cells as C. Positive wires and negative wires may extend from opposite faces as illustrated in FIGS. 3 and 4. Alternatively, both may extend from one face as illustrated in FIGS. 5 and 6.

It will be appreciated that numerous variations within the scope of the invention are contemplated. While the invention has been described in terms of sealed batteries, it is also possible to achieve benefits in flooded cell batteries as well. Also, the invention permits various unconventional battery configurations, such as a U-shaped battery.

We claim:

1. A battery construction comprising a ceramic separator having a honeycomb structure with two opposed faces between which cells run lengthwise of the honeycomb and are separated by porous walls, at least a portion of the cells having internal positive and negative electrodes positioned in part at least within the honeycomb structure and a portion of each such cell having sealing material that extends inwardly from a face of the structure and an electrode member of smaller diameter than the cell extending into the cell from the opposite face.

2. A battery construction in accordance with claim 1 wherein selected cells in the honeycomb structure are at least partially filled with active material around an electrode extending into each selected cell.

3. A battery construction in accordance with claim 2 wherein walls on the selected cells have a coating of active material and an electrode extending into the cell within the wall coating.

4. A battery in accordance with claim 2 wherein the electrode, the active material and an electrolyte substantially fill a cell.

5. A battery construction in accordance with claim 1 wherein a first selected group of cells has a sealing material extending inwardly into the cells from a first face of the honeycomb and an electrode extending into each sealed off cell from the opposite face.

6. A battery construction in accordance with claim 5 wherein a second set of cells, exclusive of the first set, has a sealing material extending inwardly into the cells from the opposite face and an electrode extending inwardly into each of said second set of cells from the first face.

7. A battery construction in accordance with claim 6 wherein each set of electrodes protrude from its respective face, and an electrically conductive layer covers each set, thereby forming positive and negative terminals.

8. A battery construction in accordance with claim 6 wherein each set of electrode wires protrudes from its respective face, an electrically insulating layer surrounds the protruding electrodes on each face, and each set of electrodes is integrally joined to form positive and negative terminals.

9. A battery construction in accordance with claim 1 wherein one face of the honeycomb structure is sealed off, electrodes are inserted in selected cells from the opposite face, and alternating electrodes are connected to form a positive terminal and the remaining electrodes are connected to form a negative terminal.

10. A battery construction in accordance with claim 1 wherein selected cells are open to provide electrolyte reservoirs.

11. A battery construction in accordance with claim 1 wherein the porosity in the wall sections of the separator is over 40% by volume, the wall thickness between electrodes is at least 0.12 mm and the honeycomb has 2–100 cells per square inch.

12. A battery construction in accordance with claim 1 wherein the ceramic separator is selected from the group composed of silica, alumina, mullite and mixtures thereof.

* * * * *